Patented May 30, 1950

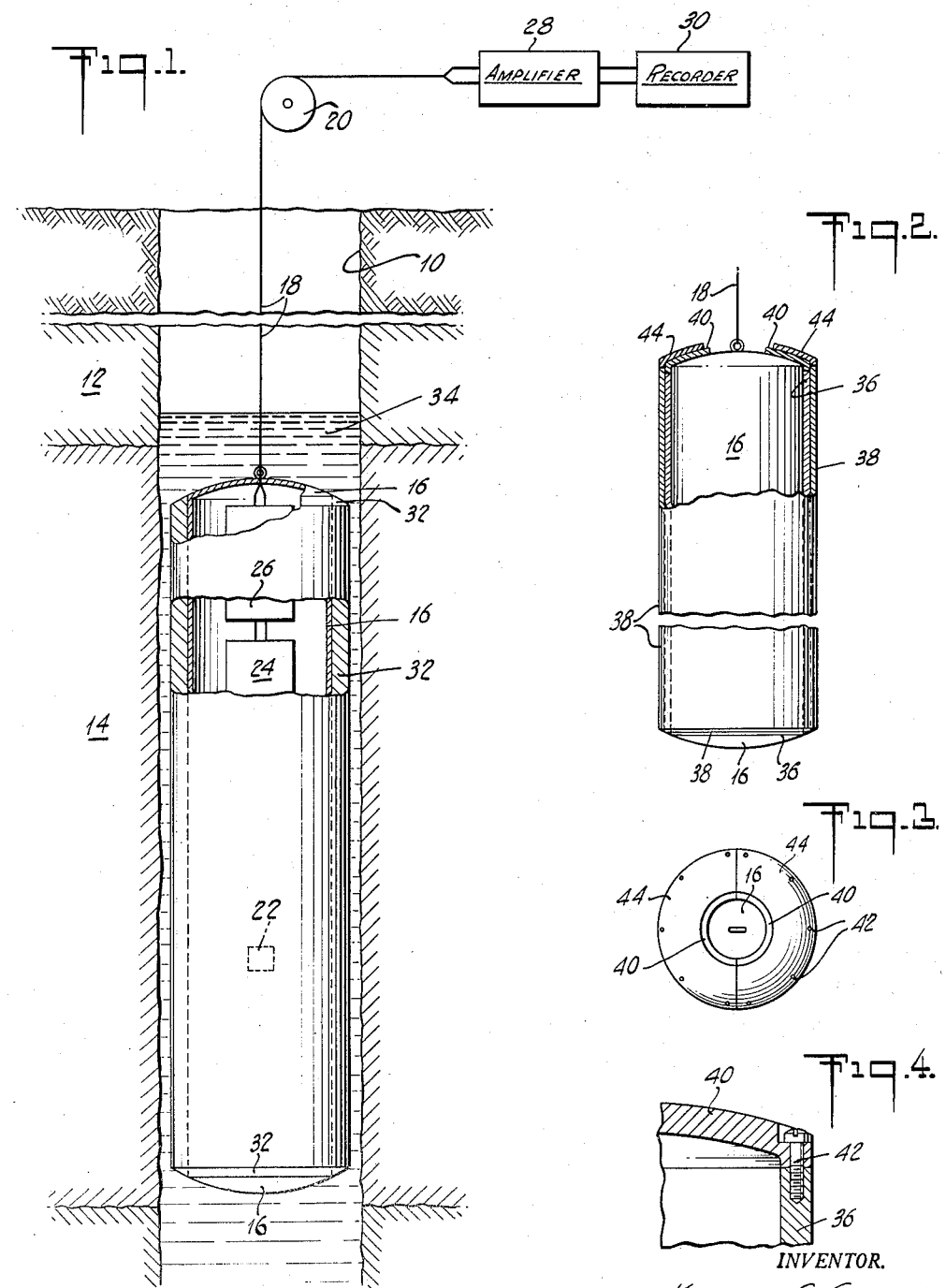

2,509,908

UNITED STATES PATENT OFFICE 2,509,908

RADIOLOGICAL WELL LOGGING

Kenneth C. Crumrine, Bellaire, Tex., assignor to The Texas Company, New York, N. Y., a corporation of Delaware Application March 28, 1945, Serial No. 585,249

5 Claims. (Cl. 250—83.6)

This invention relates to radiological well logging and more particularly to that form in which a source of penetrative radiation such as neutrons and a neutron detector are passed through a bore hole, some of the neutrons in bombarding the formations being scattered therein to return to the hole in the proximity of the detector whereby variations in the detector response are indicative of the nature of the formations traversed by the hole. The principal object of the invention is the elimination of the detrimental effect on the detector response of well fluid which is normally present in at least a portion of the hole.

In conducting this type of bore hole logging in which neutrons from a source in the hole bombard the formations, it has been found that in those portions of the holes, either cased or uncased, in which liquid is not present the logs obtained by recording the intensity of the scattered neutrons returned to the hole are usually readily reproducible while in those portions of the holes in which well fluid is present it is difficult to obtain logs which are reproducible. It has been found that the fluid in the hole is detrimental to the quality of a neutron-neutron log in two respects; firstly, it causes an increase in the counting rate which is not due to characteristics of the formations and thereby the average statistical fluctuation is increased and secondly, it masks the formations by slowing down and absorbing some of the fast neutrons on their passage from the source to the interior surface of the casing or to the surface of the formations so that the average penetration of the neutrons into the formations is decreased. Furthermore, the neutrons which are scattered back toward the detector in the bore hole are usually much slower than when emitted from the source and there is of course a greater possibility of their being captured or absorbed by the fluid in the annular space between the logging instrument and the casing or the wall of the hole so that they will not reach the detector.

In accordance with this invention the annular space between the logging instrument and the hole walls or rather the major portion of that space is filled with a body of a material which displaces the well fluid and which is relatively transparent to neutrons. Thus it has been found that a cylindrical aluminum sleeve fitted over the logging instrument and of a thickness such as to occupy most of the space around the instrument or at least around the part of the instrument containing the detector and source eliminates this detrimental effect of the presence of the well fluid, and permits the making of good reproducible logging curves regardless of whether or not well fluid is present in that portion of the hole being logged. In one particular well the internal diameter of the casing was 6¼ inches while the external diameter of the logging instrument was 4 inches. An aluminum sleeve 1-inch in thickness was placed around the instrument and after several logs were made it was found that the sleeve in displacing substantially all of the liquid around the instrument permitted duplication of logs both in the portion of the well containing no fluid and in that portion containing the fluid.

Several materials could be employed for a sleeve of this type as indicated by the following figures for the mean free path for slow neutrons:

|  | Centimeters |
|---|---|
| Sulphur | 19.1 |
| Aluminum | 11.1 |
| Tin | 8.6 |

If sulphur is used this can be contained in a thin aluminum or steel jacket of such a size as to fit snugly around the logging instrument and of a thickness such as to extend almost to the inner surface of the casing or hole walls.

It is also contemplated that instead of using one sleeve of a predetermined thickness, the liquid displacing member can be formed of two or more thinner concentric, nested sleeves of a material transparent to neutrons, the sleeves being normally suspended in nested relation around the logging instrument. If while the instrument is being lowered through the hole a narrow section of the hole is encountered, the outermost of the sleeves will lodge in the hole and slip off of the instrument which will continue downwardly with the remaining sleeve or sleeves still around it. On the return upwardly through the hole the sleeve or sleeves previously detached will be picked up again and their effect will be added to those already around the instrument on the remainder of the upward travel.

For a more complete description of the invention reference may be had to the accompanying drawing in which Fig. 1 is a vertical elevation through a bore hole showing partly in section a well logging instrument provided with a single liquid displacing outer sleeve, Fig. 2 is a vertical elevation partly in section through a similar instrument provided with two outer sleeves, Fig. 3 is a top plan view of the device of Fig. 2 and Fig. 4 is an enlarged section through a portion of one sleeve showing the manner in which the sleeves may be detachably mounted around the instrument.

Referring to the drawing a bore hole is shown as traversing several underground formations such as those indicated at 12 and 14. The hole 10 may be provided with a casing, not shown, since neutrons pass freely through the casing walls and thus a cased hole may be logged in the same manner as an uncased hole. Within the hole 10 is a sealed instrument housing 16 suspended from the surface by means of a suitable cable 18 passing around a measuring device 20 at the surface. Disposed within the housing 16 is a source 22 of neutrons which may comprise a mixture of radium and beryllium and from which neutrons pass outwardly into the formations 12 and 14 wherein some are scattered and returned to the hole 10. Also within the housing 16 is a radiation detector 24 capable of measuring the number of those scattered neutrons which strike it. The detector 24 may comprise an instrument of the Geiger-Mueller counter type or it may be a suitable proportional counter or an ionization chamber and the detector is preferably connected to a suitable pre-amplifier 26 also disposed within the housing 16 and connected inturn, through the cable 18 to an amplifier 28 at the surface, the output of which leads to a recording device 30. It is understood that by means of the device 30 a record may be made of the response of the detector 24 and correlated with the depth of the instrument in the hole as measured by the device 20. Power for energizing the detector 24 and the preamplifier 26 may be supplied either by suitable batteries disposed within the housing 16 or by conducting the power downwardly over the cable 18, as is well known.

The logging instruments indicated generally by the housing 16 are of course rather complicated and expensive pieces of apparatus and it would obviously not be practicable to build a separate instrument to fit snugly within each size of bore hole or casing. Thus in accordance with the invention, a sleeve 32 which, as before stated, may be of aluminum or some other material transparent to neutrons, is disposed around the housing 16 or at least around that part of the casing opposite the detector 16, and source 22 and is of a thickness such that it will occupy most of the annular space between the outside of the housing 16 and the casing or the walls of the hole 10. In this manner the well fluid 34 which would normally be present around the logging instrument is displaced in that portion of the hole at which the logging instrument is present and the detrimental effect of the liquid is substantially eliminated as has been explained hereinbefore.

There are instances of course where the walls of the bore are not straight and if the surrounding sleeve were made sufficiently thin for the instrument with the sleeve around it to pass through the narrowest portion there would still be considerable space around the instrument occupied by well fluid in other portions of the bore hole. In Figs. 2, 3, and 4 a modification of the invention is shown in which the housing 16 is surrounded by two sleeves 36 and 38, each being, say, half as thick as the sleeve 32 shown in Fig. 1. The sleeve 36 fits within the sleeve 38 and also reasonably snugly around the instrument housing 16. The sleeves are, however, not rigidly attached to the housing as is the case with reference to the form shown in Fig. 1 but are detachably mounted so that if at some point in the hole the diameter is less than the external diameter of the outside sleeve 38, but greater than the external diameter of the inside sleeve 36, the outersleeve 38 will become lodged in that portion of the hole while the instrument 16 surrounded by the sleeve 36 will continue downwardly. If another still narrower portion of the hole is encountered the inner sleeve 36 may lodge in that portion of the hole while the instrument 16 will again continue downwardly. On the upward travel through the hole the sleeves 36 and 38 will be picked up again so that in the upper wider portion of the hole they will again have the effect of displacing the liquid around the instrument. The inner sleeve 36 is provided at its upper end with a pair of semi-circular supporting members 40, these members being attached to the upper edge of the sleeve as by means of screws 42 as shown in Fig. 4. The outer sleeve 38 is also provided at its upper end with a pair of similar semi-circular supporting members 44. The cable 18 or rather the electrical conductors in the cable are, of course, connected to the proper instruments within the housing 16 before the latter is sealed and it would therefore be difficult to place a solid ring over the upper end of the instrument 16. With the present arrangement however, it is necessary merely to slip the inner sleeve 36 upwardly around the instrument 16 and to fasten the two semi-circular members 40 in place by means of the screws 42. The outer sleeve 38 is then pushed upwardly around the inner sleeve and the two supporting members 44 attached in a similar manner. Obviously more than two of the liquid displacing sleeves can be used in this manner if desired.

While it would naturally be impractical to have the sleeves 32, 36 or 38 thick enough to fit snugly either the walls of the hole 10 or the interior surface of the casing, any amount by which the liquid around the instrument can be replaced by a material transparent to neutrons will increase the accuracy of the log which will be obtained. As stated in a preceding paragraph a neutron-neutron logging instrument was surrounded with an aluminum sleeve only a quarter of an inch less in external diameter than the internal diameter of a well casing and the well was logged successfully without the instrument becoming stuck in the hole.

Instead of suspending the sleeves 36 and 38 from their upper ends as shown in Figures 2-4, other suitable means for releasably attaching the sleeves to the housing 16 may be used. Obviously many other modifications and variations of the invention, as hereinbefore set forth, may be made without departing from the spirit and scope thereof, but only such limitations should be imposed as are indicated in the appended claims.

I claim:

1. A device for logging a bore hole comprising a housing adapted to be lowered and raised through said hole, a source of neutrons and a detector of neutrons in said housing, said detector being responsive to neutrons from said source scattered in said formations and returned to said hole, a sleeve immediately surrounding and continuously movable with said housing and adapted to occupy most of the annular space between said housing and the wall of the hole, said sleeve being formed of a material such as aluminum substantially transparent to said neutrons, and means for recording the output of said detector.

2. A device for determining and locating the formations traversed by a well bore hole comprising an elongated housing, means for lowering and raising said housing through said bore hole, a source of neutrons and a neutron detector in said housing, said detector being adapted to measure neutrons scattered in said formations and returned to said hole, said hole being normally at least partially filled with fluid which tends to absorb and slow down said neutrons, and means comprising a sleeve affixed to and surrounding the major portion of said housing and substantially transparent to said neutrons, said sleeve having a wall thickness but slightly less than the width of the annular space between the side of the housing and the wall of said hole so as to displace most of said fluid which would otherwise affect adversely the quality of the results, said sleeve being continuously movable with said housing during the measuring operation.

3. A device for determining and locating the formations traversed by a bore hole comprising an elongated housing, means for lowering and raising said housing through said bore hole, a source of neutrons and a detector in said housing, said detector being responsive to neutrons scattered in said formations and returned to said hole, said hole being normally at least partially filled with fluid which absorbs and slows down said neutrons, means comprising a sleeve originally attached to and snugly surrounding the major portion of said housing and substantially transparent to said neutrons and having a wall thickness substantially as great as the distance between the side of the housing and the walls of said hole so as to displace most of said fluid which would otherwise interfere with the proper response of said detector, means for recording the response of said detector and means for correlating the detector response with the depth of the housing in the hole.

4. A device for determining and locating the formations traversed by a well bore hole comprising an elongated housing, means for lowering and raising said housing through said bore hole, a source of neutrons and a neutron detector in said housing, said detector being responsive to neutrons scattered in said formations and returned to said hole, said hole being normally at least partially filled with fluid which absorbs and slows down said neutrons, and means surrounding the major portion of said housing and substantially transparent to said neutrons so as to displace most of said fluid which would otherwise interfere with the proper response of said detector, said means comprising a plurality of concentric sleeves of gradually increasing diameters normally nested around and detachably engaged with said housing.

5. A device for logging a bore hole comprising a housing adapted to be lowered and raised through said hole, a source of neutrons and a detector of neutrons in said housing, said detector being responsive to neutrons from said source scattered in said formations and returned to said hole, and means substantially transparent to neutrons surrounding said housing for displacing well fluid which would otherwise fill the annular space between said housing and the walls of the hole, said means comprising a plurality of concentric sleeves of gradually increasing diameters and means for detachably supporting said sleeves around said housing so that if a constricted portion of the hole is encountered on downward travel of said device one or more of the outermost sleeves will be disengaged and will remain lodged in the hole to be picked up again on the returning upward movement of the device through the hole.

KENNETH C. CRUMRINE.

REFERENCES CITED

The following references are of record in the file of this patent:

UNITED STATES PATENTS

| Number | Name | Date |
| --- | --- | --- |
| 2,197,453 | Hassler | Apr. 16, 1940 |
| 2,220,509 | Brons | Nov. 5, 1940 |
| 2,308,361 | Fearon | Jan. 12, 1943 |
| 2,335,409 | Hare | Nov. 30, 1943 |